J. M. GOODELL.
DUST CATCHER.
APPLICATION FILED JULY 10, 1914.

1,125,032.

Patented Jan. 12, 1915.

WITNESSES:
Elmer Seavey
Henry S. Sharp

INVENTOR
James M. Goodell.
BY Geo. E. Thackray
his ATTORNEY

UNITED STATES PATENT OFFICE.

JAMES M. GOODELL, OF WESTMONT BOROUGH, PENNSYLVANIA.

DUST-CATCHER.

1,125,032.  Specification of Letters Patent.  Patented Jan. 12, 1915.

Application filed July 10, 1914.  Serial No. 850,106.

*To all whom it may concern:*

Be it known that I, JAMES M. GOODELL, a citizen of the United States, residing in the borough of Westmont, in the county of Cambria and State of Pennsylvania, have invented certain new and useful Improvements in Dust-Catchers; and I do hereby declare the following to be a full, clear, and exact description of the invention, such as will enable others skilled in the art to which it appertains to make and use the same.

My invention relates more particularly to that type of dust catchers used to separate dust from the gases taken off at the top of blast furnaces, but the novel construction thereof enables it to be used to separate dust from air or any other gas.

I provide in my improved dust catcher a cylindrical outer casing with a conical shaped bottom, a tangential inlet which whirls the entering gas and dust about the internal periphery of a plurality of hard chilled plates, and I provide a central channel for taking off the dust-freed gas, and other apparatus for removing the deposited dust.

One object of my invention is to finally separate the dust from the gas current during the period when the gas has a maximum whirling action, in such a manner that there is no opportunity for the settling dust to get picked up again by the main gas current, as is the case in the common forms of dust catchers.

Another object is to so construct the lower portion of my dust catcher, that the settled dust will not be carried up the centrally located gas discharge pipe by the siphoning action of the outgoing gas.

Another object of my invention is to use in the construction thereof such material for constructing the plates of the screen as will not be easily worn away by the abrasive action of the dust.

A further object of my invention is to provide a construction whereby the plates forming the screen may be readily removed and renewed.

Figure 1:
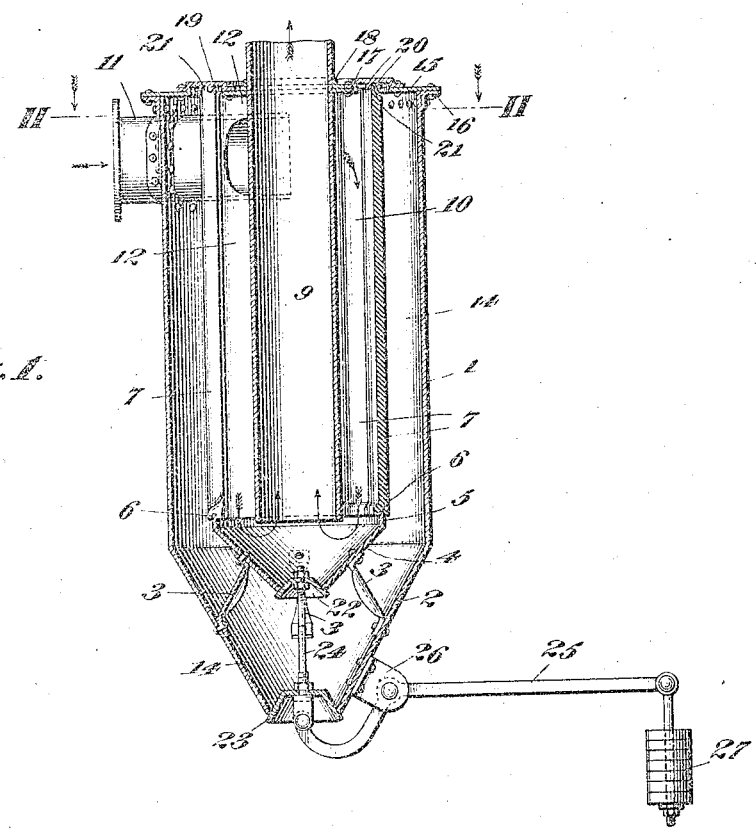
Figure 2:
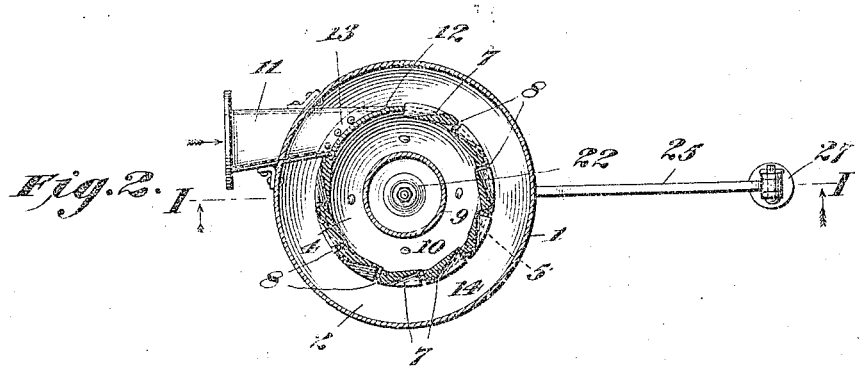

Referring now to the accompanying drawings in which like characters of reference indicate like parts:—Figure 1 is a sectional elevation of my improved dust catcher on the line I—I of Fig. 2 and Fig. 2 is a horizontal sectional elevation of the dust catcher on the line II—II of Fig. 1.

The outer casing 1 is provided with a hopper bottom 2, to the interior sides of which brackets 3 are secured, said brackets 3 being of such form as to prevent the settling of dust thereon and to rigidly support a hopper or funnel member 4 with a valve seat in the lower portion thereof. The vertically projecting flanges 5 of the hopper 4 are adapted to be received by the grooves 6 of the hard chilled plates 7, and the amount of openings 8 between the plates is adjustable by rotating the plates around the flanges 5.

A gas channel 9, adapted to receive gas from the upper region of the hopper 4, passes up through the central portion of the outer casing and forms, as it were, a whirling chamber 10, in the space inclosed by the plurality of hard chilled plates. A tangential inlet 11 is provided for the whirling chamber 10 near the top of said chamber and vertical side plates 12 which extend above and below the inlet 11 inclose that part of the whirling chamber 10 that the hard chilled plates 7 do not surround; said plates 12 being provided with flanges 13 which are riveted to the inlet pipe 11.

The dust settling chamber 14, which is intermediate of the outer casing 1 and the screen formed by plates 7 and 12, is covered with a ring plate 15, which is secured to the outer casing 1 by means of the curved angle bars 16. A second ring plate 17, attached to the pipe 9 by means of curved angle bars 18, forms a covering for the whirling chamber 10.

An open space is left intermediate the plates 15 and 17, through which the hard chilled plates 7 may be removed and renewed, when worn by the abrasive action of the dust. Removable plates 19 provide a covering for the space intermediate the ring plates 15 and 17, and grooves 20 formed therein receive the projections 21 of the hard chilled plates 7; whereby the said hard chilled plates are secured and held in the desired position.

Cone valves 22 and 23 secured to the valve rod 24 are adapted to close openings respectively in the hopper bottom 4 and the hopper bottom 2. The lever 25 attached to the hopper 2, by means of a fulcrum member 26, is adapted to control the motion of the valve rod 24. In order that the valves 22 and 23 may be closed automatically, and remain closed when it is not desired to have them open, weights 27 are hung from the outer end of lever 25. As shown in the accompanying drawings the double valves 22 and 23 are adapted to operate together, but if it is so desired they may be operated separately and still come within the scope of my invention.

The operation of my dust catcher is as follows:—Gas and particles of dust entering the chamber 10, tangentially, are whirled about the said chamber. The particles of dust being heavier than the gas will be thrown by centrifugal force, against the plates 7 and guided thereby to the chamber 14 where in due course of time, being acted upon by the force of gravity they will spend their centrifugal force and settle to the hopper bottom 2 from which the dust, so collected, may be removed by dropping the valve 23. Any dust that may fall into the hopper 4 and collect at the bottom thereof will drop through the hopper 2 when the valve 22 is removed from its seat.

That portion of the gas from which the dust has been removed will be forced, by the pressure of the incoming gas, down the chamber 10 into the upper region of the hopper member 4. It is evident that most of the dust is removed from the gas when it reaches the entrance to the channel 9, but should there happen to be a few particles of dust still left in the gas when it reaches this entrance it will drop down into the hopper 4 during the extended passage of the purified gas up through the channel 9. The channel 9 conducts the purified gas to the hot blast stoves, or to any other desired place of utilization or storage.

The hopper or funnel member 4 and the cone valve 22 close off direct communication between the entrance of the gas discharge and the settled dust in the hopper member 2; thereby preventing the siphoning action of the outgoing gas from disturbing the settled dust, as is the case in common forms of dust catchers.

Although I have shown and described my invention in considerable detail, I do not wish to be limited to the exact and specific details shown and described, but may use such substitutes, modifications or equivalents thereof, as are embraced within the scope of my invention or as pointed out in the claims.

Having thus described my invention, what I claim and desire to secure by Letters Patent is:—

1. A dust catcher comprising an outer casing, an inner screen formed of a plurality of projecting plates circumferentially adjustable around the axis of the outer casing, a centrally located gas discharge channel, means for tangentially admitting the gas and dust to the interior of said screen and means for removing the settled dust.

2. A dust catcher comprising an outer casing, an inner screen formed of a plurality of projecting hard plates circumferentially adjustable around the axis of the outer casing, a centrally located gas discharge channel, means for tangentially admitting the gas and dust to the interior of said screen member, and means for removing the settled dust.

3. A dust catcher comprising an outer casing, an inner cylinder formed of a plurality of inwardly projecting plates circumferentially adjustable around the axis of the outer casing, a centrally located gas discharge channel, means for tangentially admitting the gas and dust to the interior of said inner cylinder, and means for removing the settled dust.

4. A dust catcher comprising an outer casing, a hopper bottom therefor, an inner screen formed of a plurality of inwardly projecting plates circumferentially adjustable around the axis of the outer casing, a centrally located gas take off channel, means for tangentially admitting the gas and dust to the interior of said screen, and means for removing the settled dust.

5. A dust catcher comprising an outer casing, a hopper bottom for said outer casing, a hopper member disposed within the outer casing, vertically extending plates arranged around the upper edges of the said hopper member, an opening, provided with a removable covering, in the top of the said outer casing through which the said plates may be withdrawn, a centrally located elongated gas discharge channel, means for tangentially admitting the gas and dust to the space within the vertically extending plates, and means for removing the settled dust.

6. A dust catcher comprising an outer casing, a hopper bottom for said outer casing, a hopper member disposed within the outer casing, vertically extending inwardly projecting plates arranged around the upper edges of the said hopper member, a centrally located elongated gas discharge channel, a removable covering above the said vertically extending plates, means for tangentially admitting the gas and dust to the space within the vertically extending plates, and means for removing the settled dust.

7. A dust catcher comprising an outer casing, a hopper bottom for said outer casing a hopper member disposed within the outer casing, vertically extending inwardly projecting plates arranged around the upper edges of the said hopper member, valves adapted to close and open the said hopper bottom and the said hopper member, a centrally located gas discharge channel, a removable covering above the said vertically extending plates and means for tangentially admitting the gas and dust to the space within the vertically extending plates.

8. A dust catcher comprising an outer casing, an inner screen member formed of a plurality of inwardly projecting plates circumferentially adjustable around the axis of the outer casing, means for removing and renewing the said plates, a space intermediate the screen and the outer casing, means for tangentially admitting gas and dust into the interior of the said screen, a centrally located elongated channel adapted to take off the purified gas, and means for removing the settled dust.

9. A dust catcher comprising an outer casing, an inner screen formed of a plurality of inwardly projecting plates, a space intermediate the screen member and the outer casing, an opening in said casing provided with a removable covering, said projecting plates being alined with the said opening and adapted to be withdrawn therethrough, means for tangentially admitting the gas and dust into the interior of the screen, means for taking off the purified gas and means for removing the settled dust.

In testimony whereof I hereto affix my signature in the presence of two witnesses.

JAMES M. GOODELL.

Witnesses:
 ELMER SEAVEY,
 HENRY S. SHARP.